United States Patent [19]

Nagano

[11] Patent Number: 4,651,860

[45] Date of Patent: Mar. 24, 1987

[54] CLUTCH DISK SUPPORTED BY A RESIN BUSHING

[75] Inventor: Tamio Nagano, Hirakata, Japan

[73] Assignee: Kabushiki Kaisha Daikin Seisakusho, Hirakata, Japan

[21] Appl. No.: 745,987

[22] Filed: Jun. 18, 1985

[30] Foreign Application Priority Data

Jun. 19, 1984 [JP] Japan .............................. 59-90992[U]

[51] Int. Cl.$^4$ .......................... F16D 3/14; F16D 13/68
[52] U.S. Cl. ............................ 192/106.2; 192/70.17; 464/68
[58] Field of Search ............... 192/70.17, 106.1, 106.2; 464/64, 66, 68

[56] References Cited

U.S. PATENT DOCUMENTS

| 3,809,198 | 5/1974 | Mori | 192/106.2 |
|---|---|---|---|
| 4,220,233 | 9/1980 | Ban et al. | 192/106.2 |
| 4,398,625 | 8/1983 | Beccaris | 192/106.2 |
| 4,518,071 | 5/1985 | Nozawa | 192/106.2 |
| 4,526,261 | 7/1985 | Mair et al. | 192/106.2 |
| 4,537,296 | 8/1985 | Lech, Jr. et al. | 192/106.2 |
| 4,537,580 | 8/1985 | Loizeau et al. | 464/64 X |
| 4,549,641 | 10/1985 | Ootani et al. | 192/106.2 |
| 4,560,366 | 12/1985 | Loizeau et al. | 192/106.2 X |
| 4,564,097 | 1/1986 | Kabayama | 192/106.1 |

FOREIGN PATENT DOCUMENTS

| 167919 | 12/1981 | Japan | 192/106.2 |
|---|---|---|---|
| 2052683 | 1/1981 | United Kingdom | 464/68 |
| 2096273 | 10/1982 | United Kingdom | 192/106.2 |
| 2103758 | 2/1983 | United Kingdom | 192/106.2 |

*Primary Examiner*—Leslie Braun
*Assistant Examiner*—Dwight G. Diehl
*Attorney, Agent, or Firm*—Armstrong, Nikaido, Marmelstein & Kubovcik

[57] ABSTRACT

A clutch disk, a resin bushing being rotatably fitted onto an outer peripheral surface of a spline hub, a clutch plate being fitted onto an outer peripheral surface of the bushing, a friction washer, different from a bushing and the friction plate being disposed in this order from a flange side between a hub flange and the clutch plate, and the friction plate being made to engage with the clutch plate, a spring member being, disposed between the friction plate and the clutch plate, and a friction washer positioning mechanism being provided to prevent the friction washer from contacting with the bushing.

13 Claims, 4 Drawing Figures

CLUTCH DISK SUPPORTED BY A RESIN BUSHING

BACKGROUND OF THE INVENTION

Industrial Useful Field

This invention relates to a clutch disk (including a damper disk).

PRIOR ART

In a conventional clutch disk, an inner peripheral surface of a clutch plate 41 contacts directly with an outer peripheral surface of a spline hub 40 as shown by a lower half of FIG. 3. Namely, a direct metal-to-metal contact inevitably produces a fretting phenomenon at a contacting surface due to metal rust and causes an instability of hysteresis.

A clutch disk shown in FIG. 4 is an example wherein a bushing 42 is provided to avoid the metal-to-metal contact between the clutch plate 41 and the spline hub 40. However, the bushing 42 is formed integrally with a friction washer 43 so that a load applied on a claw 44 of the bushing 42 will become large and a durability of the bushing 42 will be worsened. Incidentally, the claw 44 engages in a notch 41a of the clutch plate 41. Further, there is a possibility that sliding friction is produced at a cone spring 45 put between the friction washer 43 and the clutch plate 41, thereby the fretting phenomenon occuring at the cone spring.

OBJECT OF THE INVENTION

An object of this invention is to stabilize a hysteresis to prevent noise or abnormal sound due to torsional vibration of a drive system by greatly decreasing metal-to-metal contact portions which produce a sliding friction and at the same time by omitting the other useless contacting portions.

STRUCTURE OF THE INVENTION

In a clutch disk according to this invention, a resin-made bushing is rotatably fitted onto an outer peripheral surface of a spline hub, a clutch plate is fitted onto an outer peripheral surface of the bushing, a friction washer being different from the bushing and the friction plate are disposed in this order from the flange side between a hub flange and the clutch plate and friction plate is made to engage with the clutch plate, a spring member which urges the friction plate toward the flange side is disposed between the friction plate and the clutch plate, and further a friction washer positioning mechanism is provided to prevent the friction washer from contacting with the bushing.

DETAILED DESCRIPTION OF THE INVENTION

Embodiment 1

Figure 1:
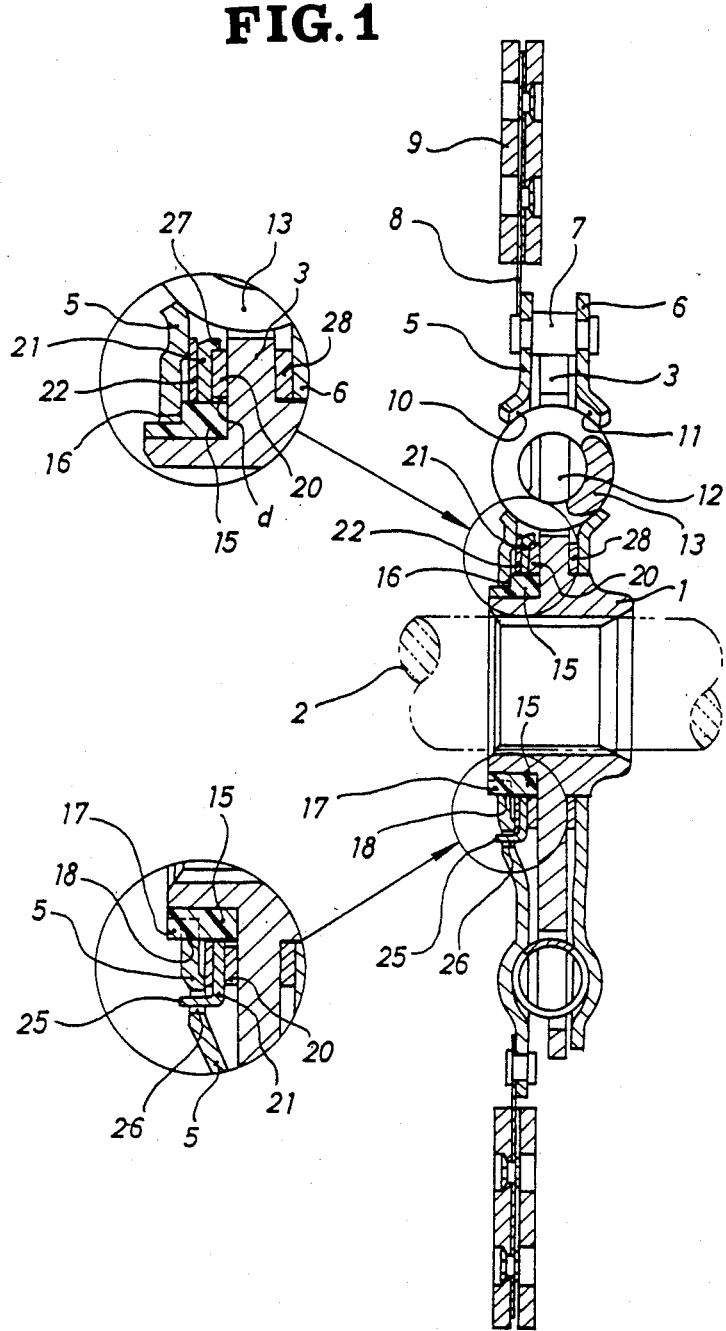
FIG. 1 is a vertical sectional partial view of a clutch disk according to this invention.

FIG. 1 shows the vertical sectional view of the clutch disk according to the present invention. In this FIG. 1, 1 is an output-side spline hub which spline fits onto an output shaft 2 and is integrally provided with an outward flange 3. A clutch plate 5 and a retaining plate 6 are disposed on both sides of the flange 3 with a space left therebetween, and the both plates 5 & 6 are connected to each other by mans of a stud pin 7. A cushioning plate 8 is fixed to an outer peripheral portion of the clutch plate 5, and an input side facing 9 is fixed to either side of the cushioning plate 8. The facing 9 is held disconnectedly between a not-shown flywheel and pressure plate.

Plural holes 10 & 11 are formed on the clutch plate 5 and the retaining plate 6, holes 12 corresponding to said holes 10 & 11 are also formed on the flange 3, and torsion springs 13 are arranged in the holes 10, 11 & 12.

A bushing 15 is rotatably fitted onto an outer peripheral surface on the clutch plate 5 side of the spline hub 1, a stepped part 16 is formed on an outer periphery of the bushing 15, and the clutch plate 5 fits onto an outer peripheral surface of the bushing 15 extending toward left from the stepped part 16. An outward claw 17 is formed on the bushing 15 as shown by a lower half of FIG. 1, the claw 17 engages with a notch 18 provided at an inner peripheral end of the clutch plate 5, thereby the clutch plate 5 and the bushing 15 are adapted to rotate integrally.

A friction washer 20 and a friction plate 21 are disposed in this order from the flange 3 side between the clutch plate 5 and the flange 3. Further, a cone spring 22 is held between the friction plate 21 and the clutch plate 5, and an elastic force of the cone spring 22 urges the friction washer 20 toward the flange 3.

An inner peripheral end of the friction plate 21 contacts with an outer peripheral surface of the bushing 15, therby the center of the friction plate 21 being aligned with a center of the hub 1. Several projections 25 extending to the clutch plate 5 side are formed at an outer peripheral end of the friction plate 21 as shown by the lower half of FIG. 1, and the projection 25 engages with an engaging hole 26. Namely, the friction plate 21 is adapted to rotate integrally with the clutch plate 5.

An inner diameter of the friction washer 20 is formed slightly larger than an outer diameter of the bushing 1. Plural guides 27 bending toward the flange 3 side are formed at an outer peripheral end of the friction plate 21 for serving as a positioning mechanism to prevent the friction washer 20 from contacting with the bushing 15 with circumferential spaces left therebetween, and the guides 27 contact with an outer peripheral end of the friction washer 20. Namely, a center of the friction washer 20 is aligned to a center of the bush 15 by the guides 27, thereby the outer peripheral surface of the bushing 15 is spaced in its entire circle from an inner peripheral surface with a clearance d provided therebetween. 28 is a sub-friction washer which is held between the retaining plate 6 and the flange 3.

Function of the Invention

When a torque is transmitted from the flywheel to the facing 9, the clutch plate 5 and the retaining plate 6 rotate integrally, and its torque is transmitted from the the torsion spring 13 through flange 3 to the hub 1 and further to the output shaft 2. When the torque increases, the both plates 5 & 6 start twisting to a forward side of rotating direction in relation to the flange 3 and compress the spring 13.

When the both plates 5 & 6 twist in relation to the flange 3, the bushing 15, the friction plate 21 and the cone spring 22 also rotate integrally with the clutch plate 5. Namely, the resin bushing 15 rotates in relation to the metal hub 1, so that the fretting phenomenon does not occur at the outer peripheral surface of the hub 1.

A hysteresis torque is produced by sliding frictions between both sides of the friction washer 20 and the flange and the friction plate 21, and by sliding frictions between both sides of the sub-friction washer 28 and the flange 3 and the retaining plate 6. Since the cone spring 22 rotates integrally with the clutch plate 5 and the friction plate 21, the sliding friction does not occur at the cone spring 22.

Further, the friction washer 20 does not contact with the bushing 15 so that a wear of the bush 15 due to a friction of the friction washer 20 does not occur.

Embodiment 2

Figure 2:
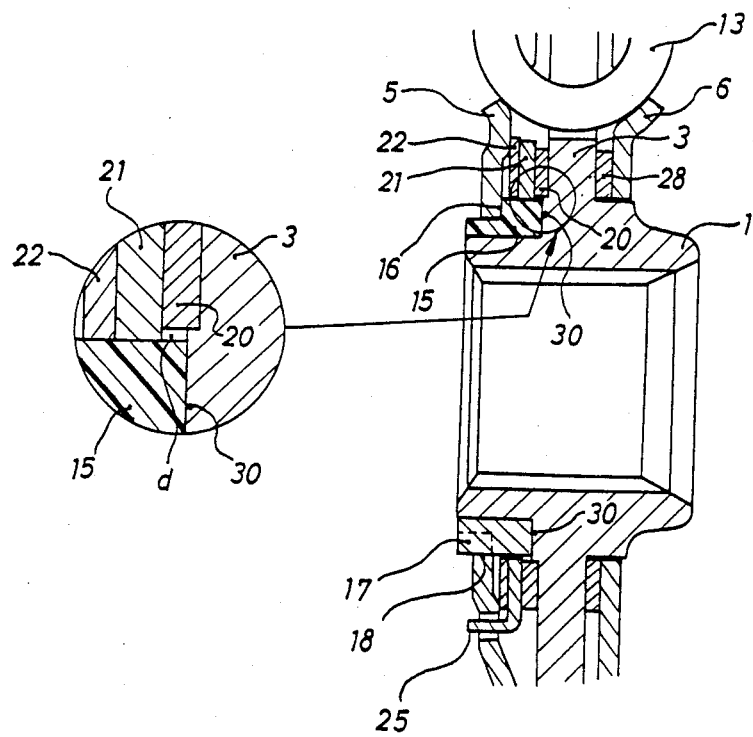
FIG. 2 is a vertical sectional enlarged partial view of another embodiment.

An embodiment shown in FIG. 2 is one in which a stepped part 30 is formed on a side of the flange 3 for serving as a positioning mechanism of the friction washer 20. Namely, the stepped part 30 having an outer diameter larger than that of the bushing 15 is formed on a side of the flange 3 and the friction washer 20 is fitted onto an outer peripheral side of the stepped part 30, thereby a clearance d being held between the friction washer 20 and the bushing 15 in their entire circles. Other structure is the same as that of the clutch disc shown in FIG. 1.

Embodiment 3

A wave washer may be used as the spring member.

Effect of the Invention (1) The resin bushing 15 is rotatably fitted onto the outer peripheral surface of the spline hub 1 and the clutch plate 5 is fitted onto the outer peripheral surface of the bushing 15, so that the metal-to-metal contact between the hub 1 and the clutch plate 5 which twists in relation to the hub can be avoided, thereby the occurence of the fretting phenomenon on the outer peripheral surface of the hub 1 can be prevented.

Consequently, the hysteresis can be stabilized, and the noise and abnormal sound from the transmission due to the torsional vibration of the drive system can be prevented.

Figure 4:
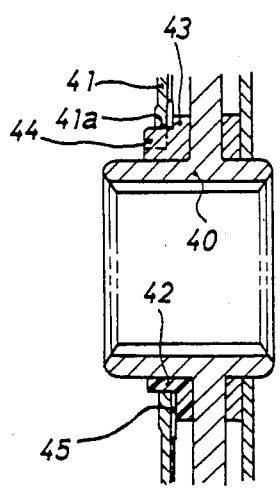
FIGS. 3 and 4 are vertical sectional enlarged partial views of conventional embodiments respectively.
Figure 3:
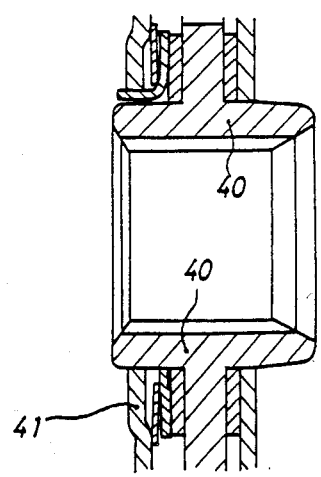

(2) Since the friction washer 20 is provided separately from the resin bushing 15, no large torque is transmitted from the friction washer 20 to the bushing as compared with the conventional embodiment of FIG. 4, and therefore there is no possibility of breakage, for example, of the claw 17 of the bushing 15.

(3) The positioning mechanism of the friction washer 20 prevents the friction washer 20 from contacting with the bushing 15, so that a wear of the bush 15 can be lessened and its durability can be improved.

(4) The spring member (cone spring 22) is arranged between the clutch plate 5 and the friction plate 21 and the friction plate 21 is made engage with the clutch plate 5, so that the spring member rotates integrally with the clutch plate 5 and the friction plate 21. Consequently, the metal-to-metal sliding frictions at both sides of the spring member can be eliminated, thereby the occurence of the fretting at position where the spring member is arranged can be prevented and a more stabilized hysteresis becomes obtainable.

What is claimed is:

1. A clutch disk, in which a resin bushing is rotatably fitted into an outer peripheral surface of a spline hub, a clutch plate is fitted onto an outer peripheral surface of the bushing, a friction washer different from the bushing and a friction plate are disposed in that order between a hub flange and the clutch plate with said friction washer next to said hub flange and said friction plate is made to engage with said clutch plate, a spring member which urges said friction plate toward said flange is disposed between said friction plate and said clutch plate, and further a friction washer positioning mechanism is provided to prevent said friction washer from contacting with said bushing.

2. A clutch disk as set forth in claim 1, in which several engaging projections bending towards said clutch plate side are formed at an outer peripheral end of said friction plate with spaces provided in the circumferential direction as a means for engaging said friction plate with said clutch plate, said projections engaging holes in said clutch plate.

3. A clutch disk as set forth in claim 1, in which several engaging projections bending toward said clutch plate side are formed at an outer peripheral end of said friction plate with spaces provided therebetween in the circumferential direction as a means for engaging said friction plate with said clutch plate, said projections engaging holes in said clutch plate, and several guides bending towards said flange formed at an outer peripheral end of said friction plate with spaces provided in the circumferential direction as a means of the positioning mechanism, said guides contacting an outer peripheral edge of said friction washer.

4. A clutch disk as set forth in claim 1, in which a stepped part is formed at an outer periphery of said resin bushing, a side of an inner peripheral end of said clutch plate contacts a stepped part of said bushing, and an outward projection terminating at said stepped part is formed on a bushing surface of smaller diameter, said projection engaging a notch at the inner peripheral edge of said clutch plate.

5. A clutch disk as set forth in claim 1, in which several engaging projections bending towards said clutch plate are formed at an outer peripheral end of said friction plate with spaces provided therebetween in the circumferential direction as a means for engaging said friction plate with said clutch plate, said projections engaging holes in said clutch plate, guides bending towards said flange are formed at an outer peripheral end of said friction plate with spaces provided in the circumferential direction as a means of the positioning mechanism, said guides contacting an outer peripheral edge of said friction washer, a stepped part is formed at an outer periphery of said resin bushing, a side of an inner peripheral end of said clutch plate stepped part of said bushing, and an outward projection terminating at said stepped part is formed on a bushing surface at the smaller diameter size, said projection engaging a notch at the inner peripheral edge of said clutch plate.

6. A clutch disk as set forth in claim 1, in which said spring member is a cone spring.

7. A clutch disk as set forth in claim 1, in which several engaging projections bending towards said clutch plate side are formed at an outer peripheral end of said friction plate with spaces provided therebetween in the circumferential direction as a means for engaging said friction plate with said clutch plate, said projections engaging holes in said clutch plate, guides bending towards said flange are formed at an outer peripheral end of said friction plate with spaces provided in the circumferential direction as a means of the positioning mechanism, said guides contacting an outer peripheral edge of said friction washer, a stepped part on an outer periphery of said resin bushing, a side of an inner peripheral end of said clutch plate contacting the stepped part of said bushing, an outward projection terminating at the stepped part is formed on a bushing surface of a small diameter size, said projection engaging a notch at the inner peripheral edge of said clutch plate, and said spring member is a cone spring.

8. A clutch disk as set forth in claim 1, in which a stepped part having an outer diameter larger than that of said bushing is formed on a side of the flange as a means of the positioning mechanism, said friction washer is fitted onto an outer peripheral side of said stepped part and providing clearance between said friction washer and said bushing.

9. A clutch disk as set forth in claim 8, in which several engaging projections bending toward said clutch plate are formed at an outer peripheral end of said friction plate with spaces provided therebetween in the circumferential direction as a means for engaging said friction plate with said clutch plate, said projections engaging holes in said clutch plate.

10. A clutch disk as set forth in claim 8, in which a stepped part is formed at an outer periphery of said resin bushing, a side of an inner peripheral end of said clutch plate contacts said stepped part of said bushing, and an outward projection terminating at said stepped part is formed on a bushing surface of a smaller diameter size, said projection engaging a notch at the inner peripheral edge of said clutch plate.

11. A clutch disk as set forth in claim 1, in which several projections bending towards said clutch plate are formed at an outer peripheral end of said friction plate with spaces provided therebetween in the circumferential direction as a means for engaging said friction plate with said clutch plate, said projections engaging holes in said clutch plate, a stepped part is formed at an outer periphery of said resin bushing, a side of an inner peripheral end of said clutch plate contacts the stepped part of said bushing, and an outward projection terminating at said stopped part is formed on a bushing surface of a smaller diameter size, said projection engaging a notch at the inner peripheral edge of said clutch plate.

12. A clutch disk as set forth in claim 8, in which said spring member is a cone spring.

13. A clutch disk as set forth in claim 8, in which several engaging projections bending towards said clutch plate are formed at an outer peripheral end of said friction plate with spaces provided therebetween in the circumferential direction as a means for engaging said friction plate with said clutch plate, said projections engaging holes in said clutch plate, a stepped part is formed at an outer periphery of said resin bushing, a side of an inner peripheral end of the clutch plate contacts said stepped part of said bushing, an outward projection terminating at said stepped part is formed on a bushing surface of a smaller diameter size, said projection engaging a notch at the inner peripheral edge of said clutch plate, and said spring member is a cone spring.

* * * * *